H. B. THOMAS.
Grain Separator.

No. 42,628.

Patented May 3, 1864.

Inventor
Henry B. Thomas
By Henry F. Hart Assignee.

UNITED STATES PATENT OFFICE.

HENRY B. THOMAS, OF CHICAGO, ILLINOIS, ASSIGNOR TO HENRY F. HART, OF SAME PLACE.

GRAIN-SEPARATOR.

Specification forming part of Letters Patent No. 4,328, dated May 3, 1864.

*To all whom it may concern:*

Be it known that I, HENRY B. THOMAS, of the city of Chicago, county of Cook, and State of Illinois, have invented a new and improved method of separating or assorting various kinds of grain—such as oats from wheat, &c.—and have, for the purpose of applying my said methods, invented a new and improved machine; and I do hereby declare that the following is a full and exact description thereof, reference being had to the accompanying drawings, making part of this specification, and to the letters of reference thereon.

The nature of my invention consists in picking the kernels of one kind of grain from a mass composed of two or more kinds, and removing and delivering them in a suitable place by themselves, while the remainder of the mass is delivered separately in another suitable place or receptacle.

To enable others skilled in the arts to make and use my invention, I will proceed to describe its construction and operation.

The main feature of my invention consists in providing the exterior surface of a moving body, whether the same be cylindrical or plane, with cells or cups of such size that when brought in contact with the mass of mixed grain the said cells shall receive the grains or kernels of wheat and remove them from the mass, the oats being too long to lie down in and be taken up by said cells, and, therefore, being rejected and left behind as the cells move forward.

Figure 1:
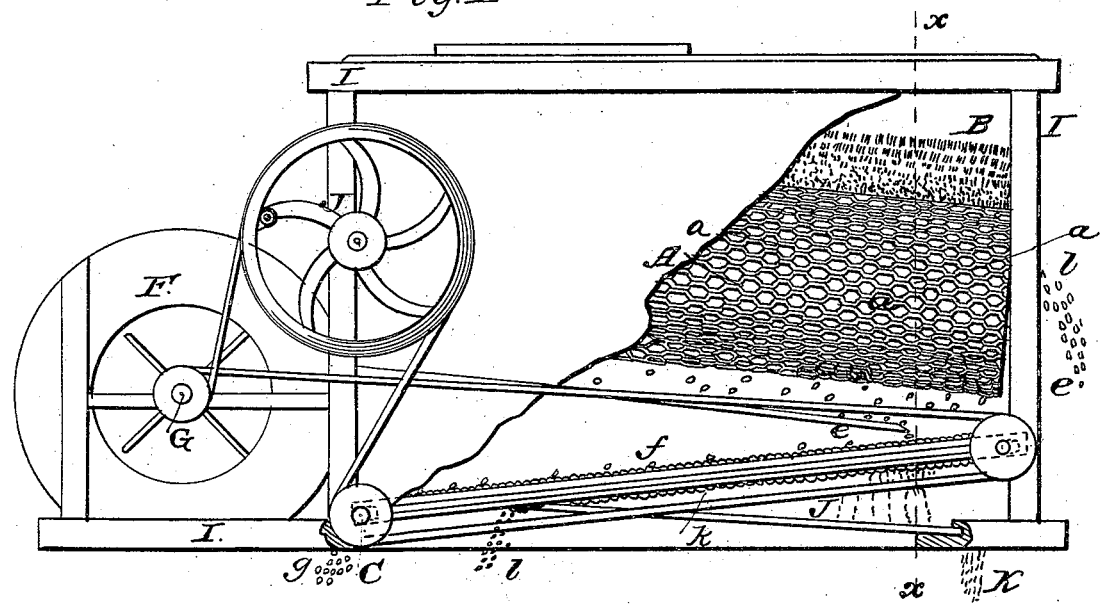
Figure 2:
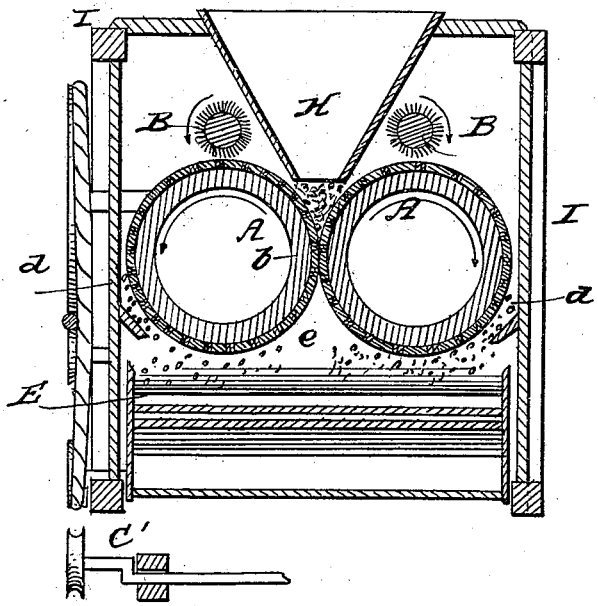

To apply this feature in the most feasible and successful manner, I construct a machine, as shown in the drawings; and of which machine Figure 1 is a side elevation; Fig. 2 a vertical transverse section taken in the line of *x x*, Fig. 1; and Fig. 3 a view of a portion of the crank-shafts operating the shoe.

I construct a suitable frame, I I, &c., in which I mount two cylinders, A A, the exterior surfaces of which are covered with or composed of small shallow cells *a*. These cells may be formed in any desirable way, and of any proper material. They may be cut into the surface of the rollers, or they may be formed in a suitable covering of proper thickness to give the cells the requisite depth, attached to the surface of the roller—such as leather, zinc, cast-iron, and similar substances—but the method which I have found to work best in practice is as follows: I prepare a smooth wooden cylinder. I then take small flattened wire, similar to that used in hoop-skirts in its form, and so bend it that when two of the bent portions are placed opposite each other in reversed positions they shall constitute a cell, *a*, it being understood that the wire is made to rest upon its edge, one half of the circumference or walls of said cell being formed by the bend in one wire, and the other half by the bend in the corresponding wire, as shown in Fig. 1. I then attach these wires, thus bent, to the smooth cylinder in such a way as to form similar cells over its entire surface, as shown by A, Fig. 1. Two of these cylinders are mounted side by side in the frame, in close proximity, so as to cause their peripheries to come in contact, as shown at *b* in Fig. 2. These rollers are so geared or driven as to cause them to move in the direction indicated by the arrows in Fig. 2.

Directly over these cylinders A A, I place two revolving circular brushes, B B, one over each cylinder, and of equal length therewith. These brushes revolve in the direction indicated by the arrows marked thereon, respectively, as shown in Fig. 2, and are so located that they will constantly sweep the surface of the cylinders as they revolve.

In case the cylinders are mounted inclined, as shown in Fig. 1, a suitable hopper, H, is located at the upper end thereof, by which the grain is fed in between the cylinders from above; or the cylinders may be located in a horizontal plane, in which case the hopper may be placed at the center longitudinally.

In the frame beneath the cylinders is mounted a suitable shoe, E, provided with return or chute boards and screens, as clearly shown in Figs. 1 and 2. A fan, F, may also be located at one end of the machine, as shown in Fig. 1; but as these devices form no essential part of my invention a further description is deemed unnecessary. The fan is not required when the machine is used by millers, or in any other case in which the grain has been already cleaned of its dust, &c., by having been passed through a smutter or duster.

The machine may be operated by any suitable mechanism, care being taken to give the cylinders and brushes motion in the directions indicated by the arrows. In Fig. 1 the fan shaft G and the two crank-shafts $c$ and $c'$, which operate the shoe E, are all shown driven by one belt, which receives motion from wheel J, and from the shaft of which motion is imparted, by suitable mechanism, to the cylinders A A and brushes B B.

The operation of the machine is as follows: The mixed grain is placed in the hopper H, from whence it is fed in between the cylinders B B, when the kernels of wheat fall into the cells $a$ and are carried up toward the brushes as the cylinders revolve, while the oats, being too long to lie down in the cells, are left behind; or if by any means they become attached to the surface of the cylinder and are carried up therewith, they are immediately brushed off and thrown back, when they come in contact with the brushes B B. The kernels of wheat, being held secure within the cells, are carried past the brushes and are thrown out on the downward movement of the outer side of the cylinder, as shown at $d$ $d$, Fig. 2, when it falls upon the return or chute board $e$, by which it is delivered onto the upper end of screen $f$, from the lower end of which the first quality of wheat is delivered, as shown at $g$, Fig. 1. The smaller grains of wheat pass through screen $f$ onto screen $h$, lying underneath and parallel therewith, and is delivered from the lower end of the same, as shown at $i$. All grass-seed and other foul stuff passes through screen $h$ onto the return-board $j$, which delivers it at $k$, Fig. 1. The oats, in the meantime, are kept in motion by the revolution of the cylinders and are moved longitudinally toward the lower ends thereof, where they are discharged outside of the machine into a proper receptacle, as shown at $l$, Fig. 1. By these means not only are the wheat and oats completely separated but the wheat itself is also divided into two grades and entirely cleaned of all impurities.

The advantage of this perfect separation of oats from wheat are too obvious to need stating. It is a result the accomplishment of which has long been sought by farmers, millers, and others dealing in grain, and which it is confidently believed is accomplished by my invention more perfectly than it has ever before been done.

It is obvious that an endless belt or other plane surface, provided with the cells, may be substituted for the cylinders and made to produce the same or similar results when properly arranged for that purpose, but that would be a mere modification of my invention.

Having thus fully described my invention, what I claim as new therein, and for which I desire to secure Letters Patent, is—

1. The separation of mixed grains by means of the cells $a$, when the same are applied to the exterior surface of cylinders or their equivalents.

2. The cylinders A A, provided with the cells $a\ a$, substantially as shown.

3. Forming the cells upon the surface of the cylinders A by means of the narrow strips of metal bent, as shown and described, or by any equivalent means.

4. One or more brushes, B, when used in combination with a surface provided with the cells $a$, substantially as and for the purpose set forth.

5. In combination with the cylinders A A, or their equivalent, the shoe E, provided with the screen $f$ and $h$, and the return-boards $e$ and $j$, when constructed substantially as shown.

HENRY B. THOMAS. [L. S.]

Witnesses:
HENRY E. HAMILTON,
WILLIAM B. MIX.